(12) United States Patent
Park et al.

(10) Patent No.: US 7,668,452 B2
(45) Date of Patent: Feb. 23, 2010

(54) APPARATUS FOR AUTOMATICALLY CONTROLLING EXPOSURE OF IMAGE SENSOR

(75) Inventors: Keun Woo Park, Gyunggi-do (KR); Bong Soon Kang, Busan (KR); Joo Hyun Kim, Busan (KR); Hyun Sik Kim, Busan (KR); Kang Joo Kim, Gyunggi-do (KR); Tae Eung Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 380 days.

(21) Appl. No.: 11/808,751

(22) Filed: Jun. 12, 2007

(65) Prior Publication Data

US 2007/0286593 A1 Dec. 13, 2007

(30) Foreign Application Priority Data

Jun. 12, 2006 (KR) ....................... 10-2006-0052767

(51) Int. Cl.
*G03B 7/00* (2006.01)
(52) U.S. Cl. ..................... 396/213; 396/246; 348/221.1
(58) Field of Classification Search ................ 396/246, 396/169, 213; 348/221.1
See application file for complete search history.

(56) References Cited

U.S. PATENT DOCUMENTS

| 4,739,409 | A | | 4/1988 | Baumeister | |
|---|---|---|---|---|---|
| 4,899,191 | A | * | 2/1990 | Maruyama | 396/63 |
| 4,951,077 | A | * | 8/1990 | Kaneko et al. | 396/61 |
| 5,650,944 | A | * | 7/1997 | Kise | 700/304 |
| 2001/0028796 | A1 | * | 10/2001 | Yamanaka et al. | 396/281 |

FOREIGN PATENT DOCUMENTS

JP 2003-153073 5/2003

* cited by examiner

*Primary Examiner*—W. B. Perkey
*Assistant Examiner*—Linda B Smith

(57) ABSTRACT

An automatic exposure control apparatus employed by an image sensor module including a lens unit, an image sensing unit having a shutter, and an image signal processing unit, the apparatus including: a brightness calculator extracting average brightness of a image signal; a brightness adjustment determiner determining whether to fix or adjust a speed of the shutter based on the average brightness; an adjustment path controller controlling the speed of the shutter by using the brightness error; a digital filter filtering the brightness error; a shutter speed adjuster adjusting a present shutter speed value by using one of the brightness error and the filtered brightness; and a shutter speed controller controlling a speed of the shutter by using the adjusted shutter speed value.

12 Claims, 9 Drawing Sheets

APPARATUS FOR AUTOMATICALLY CONTROLLING EXPOSURE OF IMAGE SENSOR

CROSS-REFERENCE TO RELATED APPLICATIONS

This application claims the priority of Korean Patent Application No. 2006-0052767 filed on Jun. 12, 2006, in the Korean Intellectual Property Office, the disclosure of which is incorporated herein by reference.

BACKGROUND OF THE INVENTION

1. Field of the Invention

The present invention relates to an automatic exposure control apparatus for an image sensor employed by a camera module and a method thereof, and more particularly, to an automatic exposure control apparatus for an image sensor, the apparatus controlling an exposure to be suitable by using average brightness and changing a shutter speed by using a digital filter, thereby actively and quickly adapting to rapid and frequent brightness variances.

2. Description of the Related Art

In general, in the case of general cameras, automatic exposure control of suitably controlling brightness of inputted images is performed. The automatic exposure control is performed by controlling an aperture ratio of an aperture and controlling a speed of a shutter.

On the other hand, in the case of general digital cameras, solid imaging devices such as charged coupled devices (CCDs) and complementary metal-oxide semiconductors (CMOSs) are used as an image sensor, in which an amount of exposure is controlled by controlling a time for being photographed by the image sensor. In this case, the time for being photographed by the image sensor corresponds to a speed of an electronic shutter. Brightness of an image is controlled to be suitable by changing the speed of the electronic shutter.

FIG. 1 is a block diagram illustrating an image sensor of a conventional digital camera.

The image sensor shown in FIG. 1 includes a lens unit 10 receiving an incident image, an image sensing unit 20 having a shutter, photographing an image from the lens unit 10 via the shutter, and converting into an electric image signal, an image signal processing unit 20 restoring the image signal from the image sensing unit 20 to the image, and a micro controller 40 calculating brightness of the image signal from the image signal processing unit 30 and controlling the shutter of the image sensing unit 20 according to a difference between the calculated brightness and reference brightness.

An exposure control process in the micro controller 40 will be described as follows.

The micro controller 40 calculates brightness of a present image for each frame (S41), calculates a difference between the calculated brightness and reference brightness (S42), calculates a brightness adjustment value according to the difference of brightness (S43), obtains a future application value by adding the adjustment value to a present exposure conversion value (S44), obtains an approximate multiple value by approximating the future application value to a multiple of the least exposure time (S45), and controls the shutter of the image sensing unit 20 by using the multiple (S46).

However, in the case of the exposure control method of the conventional digital camera, when there is a rapid change in exposure of an input image while performing a calculation for obtaining a suitable exposure by using an exclusive micro controller, a large amount of time is required to obtain the suitable exposure.

Also, in a process of calculating based on information on brightness of an image signal, since data on the brightness is excessively large, a large amount of time is required to calculate.

In addition, when an exposure rapidly and frequently changes for a short time, since the micro controller is not capable of recognizing a rapid exposure change, brightness cannot be controlled to be suitable when there is the rapid exposure change.

SUMMARY OF THE INVENTION

An aspect of the present invention provides an automatic exposure control apparatus and method for an image sensor, the apparatus controlling an exposure to be suitable by using average brightness without a micro controller and changing a shutter speed by using a digital filter, thereby actively adapting to rapid and frequent brightness variances of images and operating at high speed.

According to an aspect of the present invention, there is provided an automatic exposure control apparatus employed by an image sensor module including a lens unit receiving an incident image, an image sensing unit having a shutter, photographing the image from lens unit via the shutter, and converting the image into an electrical image signal, and an image signal processing unit restoring the image signal from the image sensing unit to an image, the apparatus including: a brightness calculator extracting average brightness from the image signal of the image signal processing unit; a brightness adjustment determiner determining whether to fix or adjust a speed of the shutter based on a brightness error value corresponding to an error between the average brightness from the brightness calculator and reference brightness; an adjustment path controller directly controlling the speed of the shutter to be adjusted when the brightness error value is included within a predetermined minimum error range and controlling the speed of the shutter to be filtered when the brightness error value is out of the predetermined minimum error range; a digital filter filtering the brightness error value according to control of the adjustment path controller and outputting a filtered brightness error value; a shutter speed adjuster adjusting a present shutter speed value by using one of the brightness error value from the adjustment path controller and the filtered brightness error value from the digital filter and providing a control shutter speed value; and a shutter speed controller controlling a speed of the shutter of the image sensing unit by using the control shutter speed value.

The brightness calculator may calculate the average brightness of the image at a present shutter speed for each frame.

The brightness adjustment determiner may convert the average brightness into an average brightness index value referring to a first look-up table in which an index value for each average brightness is previously mapped, may obtain a brightness error index value corresponding to an error between a reference brightness index value and the average brightness index value, may determine the present shutter speed value as the control shutter speed value when the brightness error index value is 0, and may determine controls the present shutter speed value to be adjusted when the brightness error index value is not 0.

The adjustment path controller may control a present shutter speed index value to be adjusted when the brightness error index value is included within a predetermined minimum error range and may control the present shutter speed index value to be filtered when the brightness error index value is out of the predetermined minimum error range, according to control of the brightness adjustment determiner.

The digital filter may filter the brightness error index value and may output a filtered brightness error value according to control of the adjustment path controller.

The shutter speed adjuster may adjust the shutter speed index value by using one of the brightness error index value from the adjustment path controller and the filtered brightness error value from the digital filter and may determine a control shutter speed index value.

The shutter speed controller may convert the control shutter speed index value into the control shutter speed value by referring to a second look-up table in which the control shutter speed value is previously mapped for each the control shutter speed index value and may control the speed of the shutter of the image sensing unit by using the control shutter speed value.

The predetermined minimum error range may be determined as from −2 to 2.

The digital filter may include: a multiplier multiplying the brightness error index value by a predetermined coefficient; an integer converter converting an output value from the multiplier into a closest integer and outputting a filtered brightness error value; a first register storing a first difference value corresponding to a difference value between the brightness error index value of a present frame of the image signal toward a frame previous by one and the filtered brightness error value; a second register storing a second difference value corresponding to a difference value between the brightness error index value of the present frame of the image signal toward a frame previous by two and the filtered brightness error value; and a coefficient selector selecting one of predetermined filter coefficients according to the brightness error index value, the first difference value, and the second difference value.

According to another aspect of the present invention, there is provided an automatic exposure control method of an image sensor module including a lens unit receiving an incident image, an image sensing unit having a shutter, photographing the image from lens unit and converting the image into an electrical image signal, and an image signal processing unit restoring the image signal from the image sensing unit to an image, the method including: calculating average brightness of an image at a present shutter speed, for each frame; converting the average brightness into an average brightness index value by referring to a first look-up table in which an index value is previously mapped for each average brightness; obtaining a brightness error index value corresponding to an error between a reference brightness index value assigned to a predetermined reference brightness and the average brightness index value; determining a present shutter speed value as a control shutter speed value when the brightness error index value is 0; determining a control shutter speed index value by adjusting a present shutter speed index value by using the brightness error index value when the brightness error index value is not 0 and included within a predetermined minimum error range; obtaining a filtered brightness error value by filtering the brightness error index value when the brightness error index value is out of the predetermined minimum error range; determining the control shutter speed index value by adjusting the present shutter speed index value by using the filtered brightness error value from a digital filter; converting the control shutter speed index value into the control shutter speed value by referring to a second look-up table in which a shutter speed value is mapped for each the control shutter speed index value; and controlling a speed of the shutter of the image sensing unit by using the control shutter speed value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
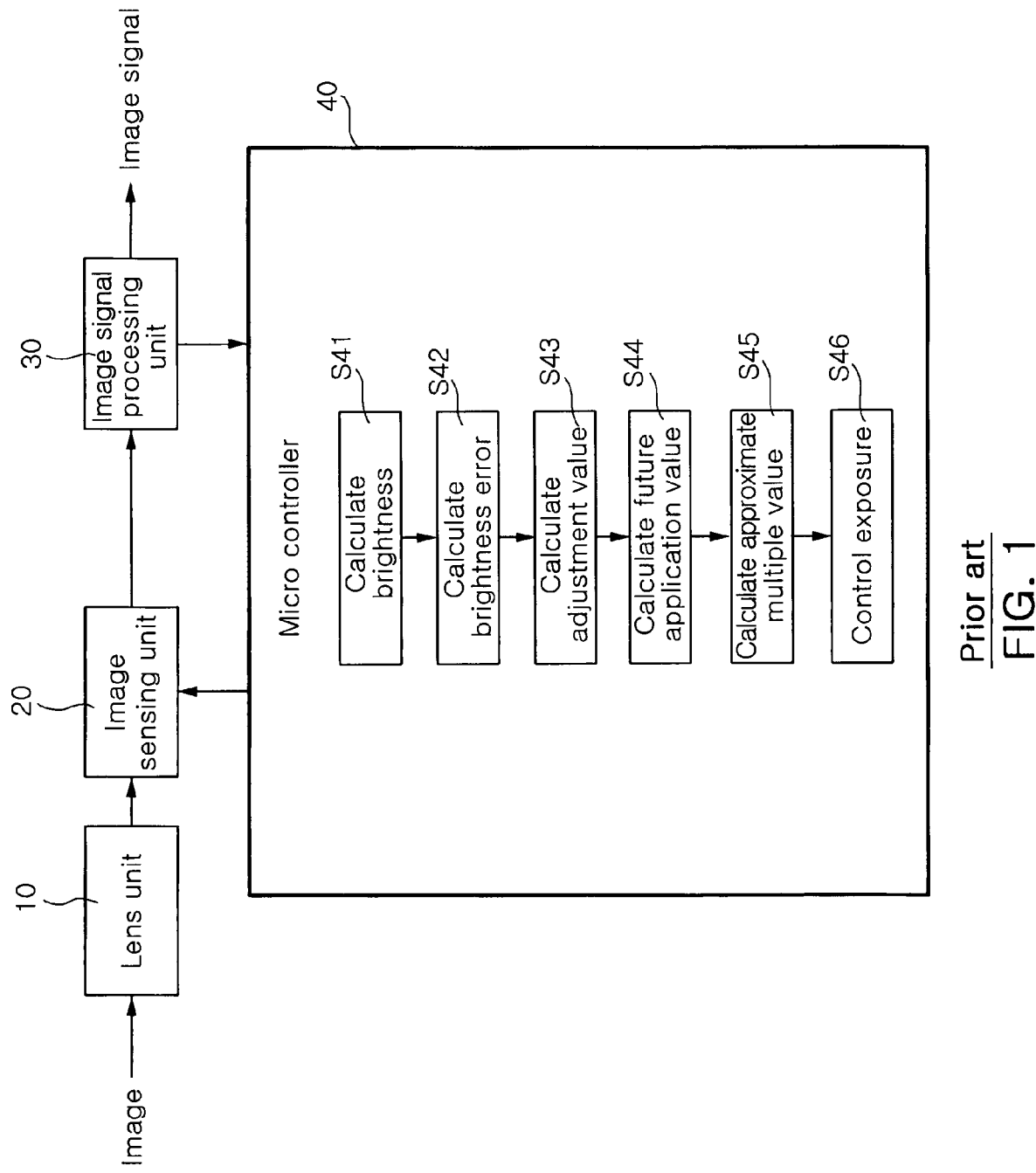
FIG. 1 is a block diagram illustrating an image sensor of a conventional digital camera.

Hereinafter, exemplary embodiments of the present invention will now be described in detail with reference to the accompanying drawings. Like elements having an actually identical configuration and function will be designated by like reference numerals in the drawings.

Figure 2:
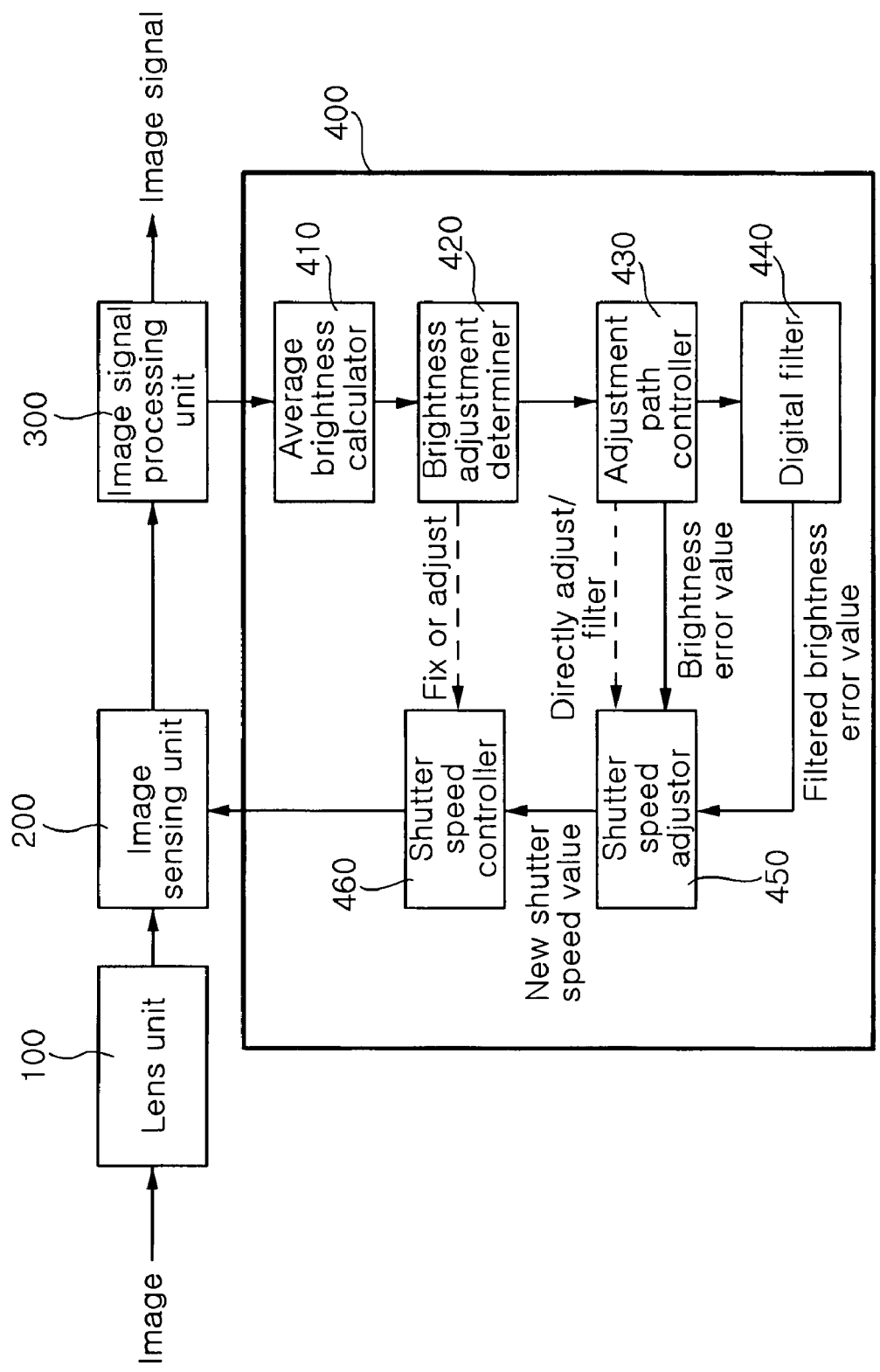
FIG. 2 is a block diagram illustrating an automatic exposure control apparatus of an image sensor, according to an exemplary embodiment of the present invention.

FIG. 2 is a block diagram illustrating an automatic exposure apparatus of an image sensor module, according to an exemplary embodiment of the present invention.

Referring to FIG. 2, the image sensor module includes a lens unit 100 receiving an incident image, an image sensing unit 200 having a shutter, photographing an image from the lens unit 100 via the shutter, and converting the image into an electric image signal, an image signal processing unit 300 restoring the image signal from the image sensing unit 200 to an image, and an automatic exposure control apparatus 400 controlling a speed of the shutter of the image sensing unit 200 based on average brightness from the image signal processing unit 300.

The automatic exposure control apparatus 400 includes a brightness calculator 410 extracting average brightness from the image signal of the image signal processing unit 300; a brightness adjustment determiner 420 determining whether to fix or adjust a speed of the shutter based on a brightness error value corresponding to an error between the average brightness from the brightness calculator 410 and reference brightness; an adjustment path controller 430 directly controlling the speed of the shutter to be adjusted when the brightness error value is included within a predetermined minimum error range and controlling the speed of the shutter to be filtered when the brightness error value is out of the predetermined minimum error range; a digital filter 440 filtering the brightness error value according to control of the adjustment path controller 430 and outputting a filtered brightness error value; a shutter speed adjuster 450 adjusting a present shutter speed value by using one of the brightness error value from the adjustment path controller 430 and the filtered brightness error value from the digital filter 440 and providing a control shutter speed value; and a shutter speed controller 460 controlling a speed of the shutter of the image sensing unit 200 by using the control shutter speed value.

The brightness calculator 410 calculates average brightness Yavr of an image at a present shutter speed Sc for each frame and calculates the average brightness for each frame.

The brightness adjustment determiner 420 converts the average brightness Yavr into an average brightness index value IYavr by referring to a first look-up table in which an index value for each average brightness is previously mapped, obtains a brightness error index value Err-index corresponding to an error between a reference brightness index value IYref and the average brightness index value IYavr, determines the present shutter speed value Sc as a control shutter speed value Sn when the brightness error index value Err-index is 0, and determines controls the present shutter speed value Sc to be adjusted when the brightness error index value Err-index is not 0.

The adjustment path controller 430 controls a present shutter speed index value ISc to be adjusted when the brightness error index value Err-index is included within a predetermined minimum error range and controls the shutter speed index value ISc to be filtered when the brightness error index value Err-index is out of the predetermined minimum error range, according to control of the brightness adjustment determiner 420.

The digital filter 440 filters the brightness error index value Err-index and outputs a filtered brightness error value Err-filtering according to control of the adjustment path controller 430.

The shutter speed adjustor 450 adjusts the shutter speed index value ISc by using one of the brightness error index value Err-index from the adjustment path controller 430 and the filtered brightness error value Err-filtering from the digital filter 440 and determines a control shutter speed index value ISn.

The shutter speed controller 460 converts the control shutter speed index value ISn into the control shutter speed value Sn by referring to a second look-up table in which the control shutter speed value is previously mapped for each the control shutter speed index value and controls the speed of the shutter of the image sensing unit 200 by using the control shutter speed value.

Figure 3:
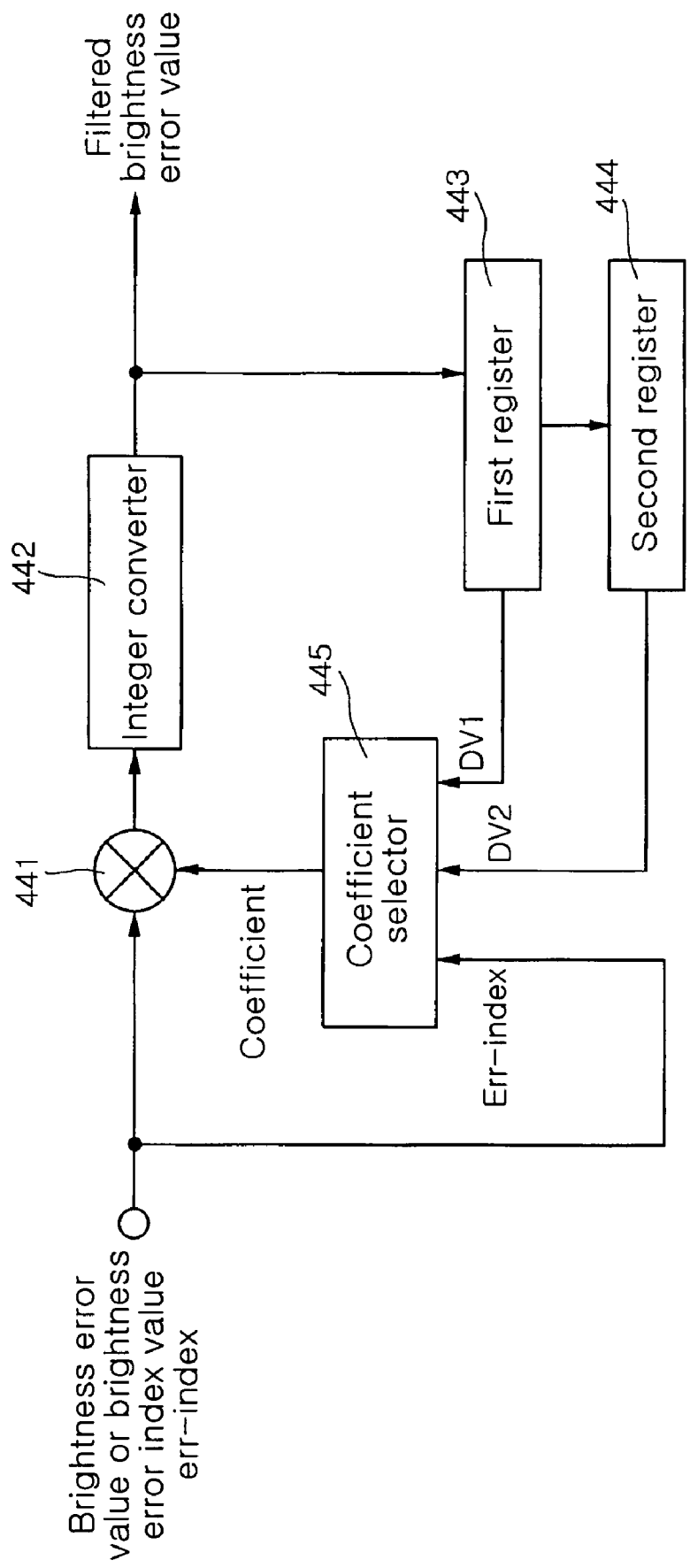
FIG. 3 is a block diagram illustrating a digital filter according to an exemplary embodiment of the present invention.

FIG. 3 is a block diagram illustrating the digital filter 440.

Referring to FIG. 3, the digital filter 440 includes a multiplier 441 multiplying the brightness error index value Err-index by a predetermined coefficient; an integer converter 442 converting an output value from the multiplier 441 into a closest integer and outputting a filtered brightness error value Err-filtering; a first register 443 storing a first difference value corresponding to a difference value DV1 between the brightness error index value Err-index of a present frame of the image signal toward a frame previous by one and the filtered brightness error value Err-filtering; a second register 444 storing a second difference value DV2 corresponding to a difference value between the brightness error index value Err-index of the present frame of the image signal toward a frame previous by two and the filtered brightness error value Err-filtering; and a coefficient selector 445 selecting one of predetermined filter coefficients according to the brightness error index value Err-index, the first difference value DV1, and the second difference value DV2.

A first infinite impulse response filter may be used as the digital filter 440 according to an exemplary embodiment of the present invention.

Figure 4:
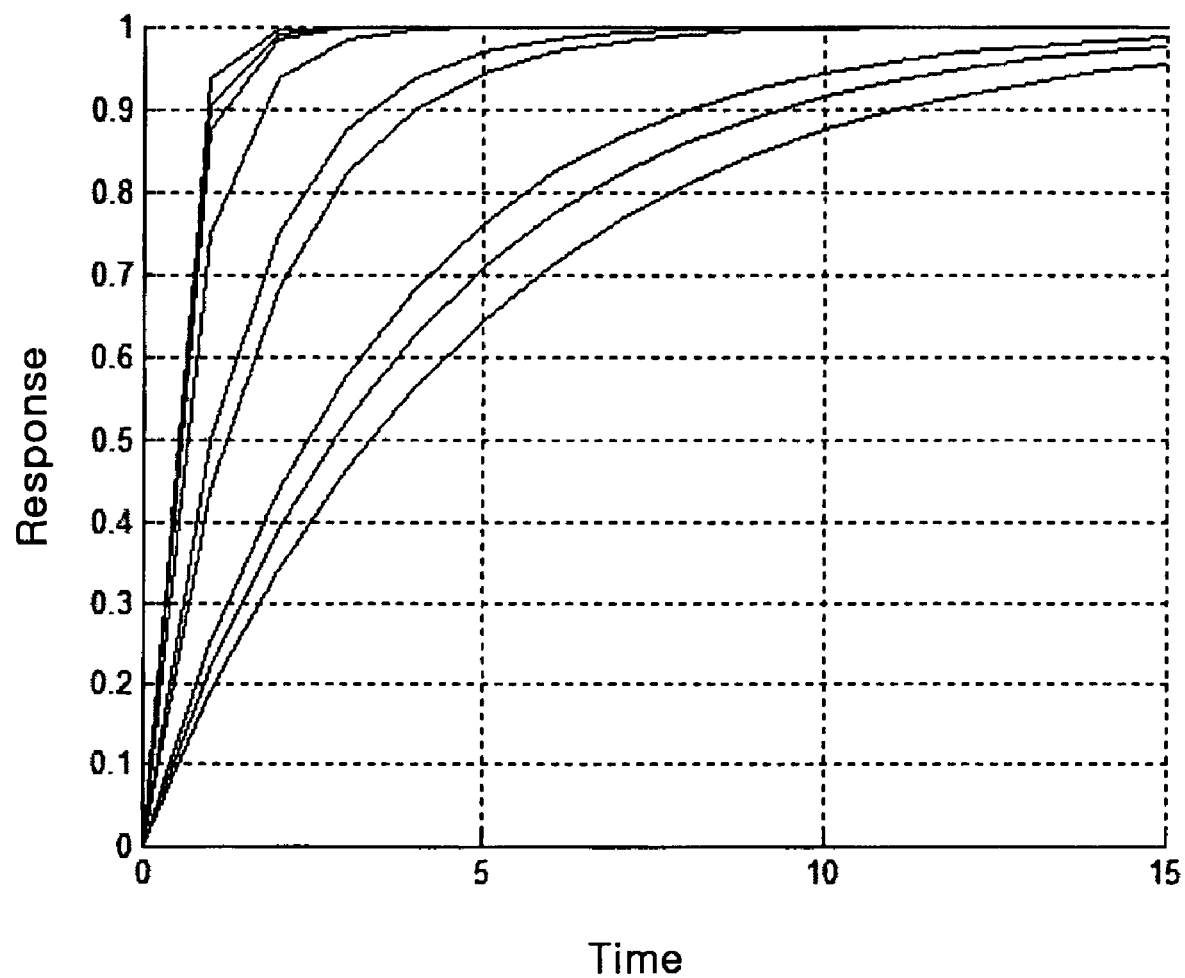
FIG. 4 is a graph illustrating response characteristics of a digital filter according to an exemplary embodiment of the present invention.

FIG. 4 is a graph illustrating response characteristics of the digital filter 440.

Referring to FIG. 4, the digital filter 440 has characteristics of responding to different coefficients. Respective response curves have a different time constant for reaching a stable state. When using a coefficient of a curve showing a gradually rising response, the time constant for reaching a stable state becomes large, that is, a large amount of time is required to detect a suitable exposure. On the other hand, when using a coefficient of a curve showing a precipitously rising response, the time constant becomes small, that is, the suitable exposure may be detected in a short time.

Figure 5:
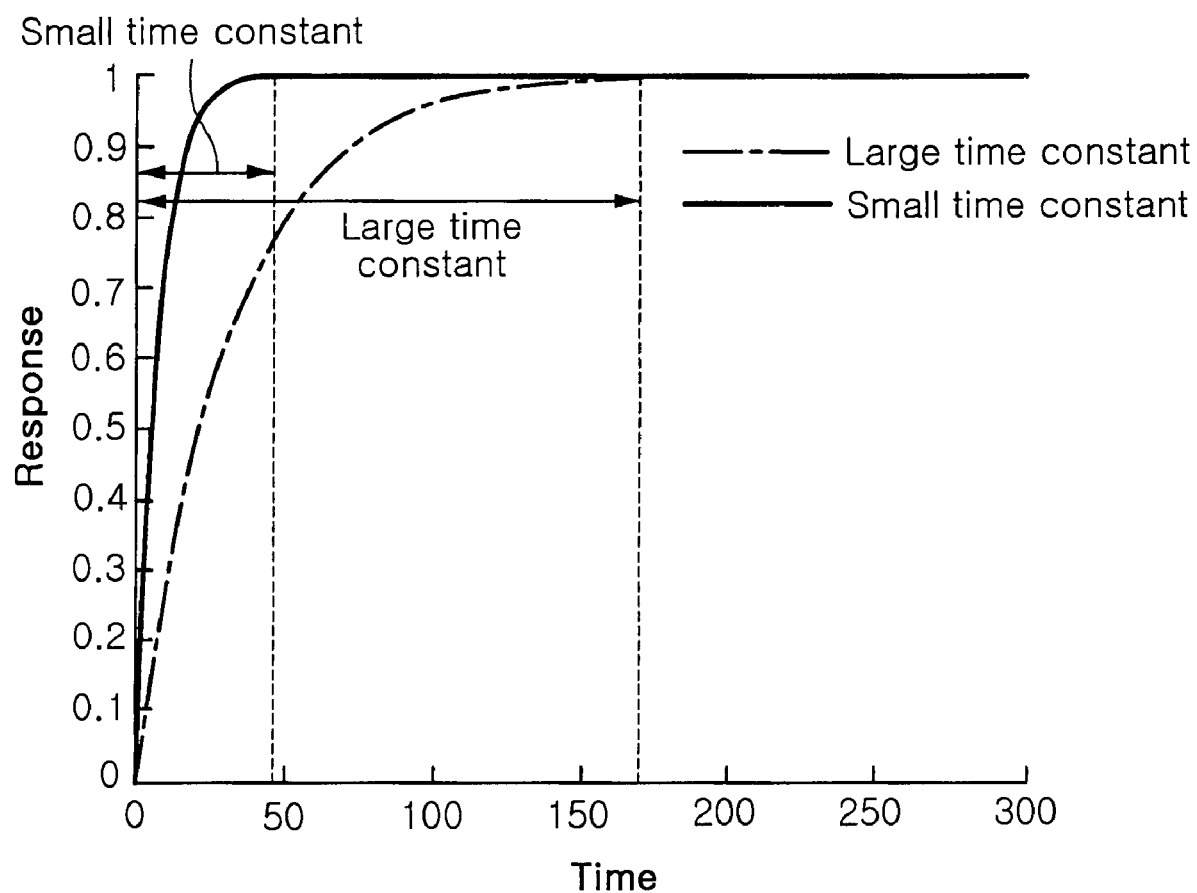
FIG. 5 is a graph illustrating response characteristics of the digital filter, in which an output waveform with respect to an input of a staircase waveform is shown.

FIG. 5 is a graph illustrating response characteristics of the digital filter 440, in which an output waveform with respect to an input of a staircase waveform is shown.

Referring to FIG. 5, an output waveform of the digital filter 440 when inputting a staircase waveform of transiting from "0" to "1" to the digital filter 440 is shown. In this case, in FIG. 5, a state after a point in time when the digital filter 440 outputs "1" is designated as the stable state and a time for outputting from "0" to "1" is designated as the time constant.

Figure 6:
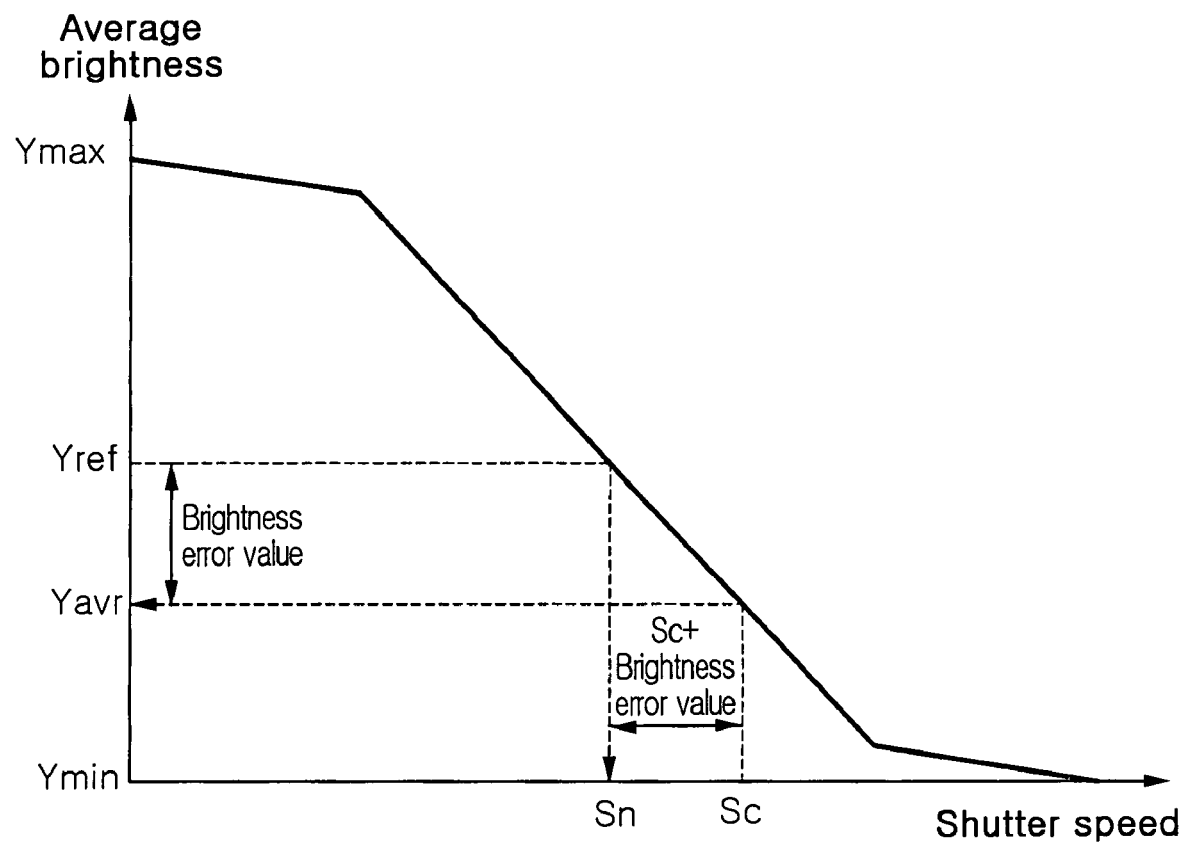
FIG. 6 is a graph illustrating a correlation between average brightness and a shutter speed to describe operations of the automatic exposure control apparatus according to an exemplary embodiment of the present invention.

FIG. 6 is a graph illustrating a correlation between average brightness and a shutter speed to describe operations of the automatic exposure control apparatus according to an exemplary embodiment of the present invention.

Referring to FIG. 6, a vertical axis of the graph indicates average brightness Yavr of an image and a horizontal axis of the graph indicates a shutter speed S. The lower the shutter speed S, the higher the average brightness Yavr. The higher the shutter speed S, the lower the average brightness Yavr.

Figure 7:
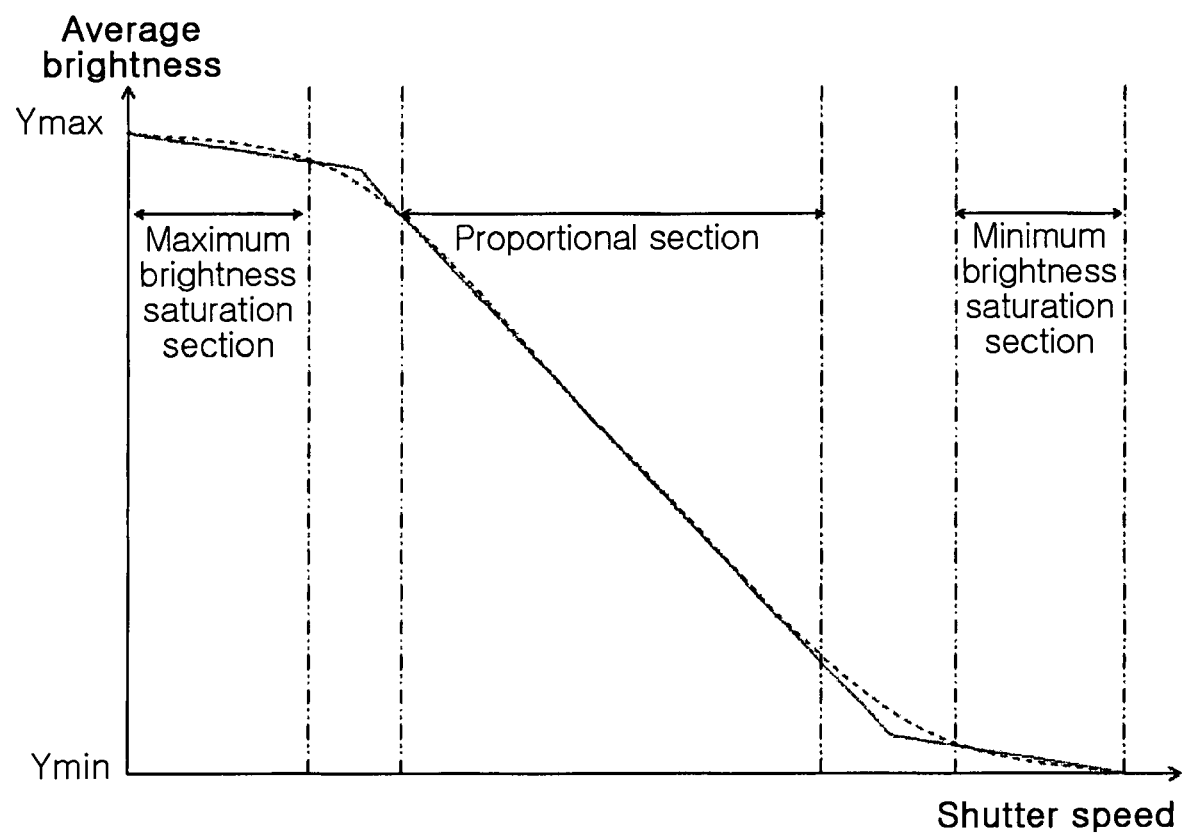
FIG. 7 is a graph illustrating a method of calculating brightness characteristics for each shutter speed, according to an exemplary embodiment of the present invention.

FIG. 7 is a graph illustrating a method of calculating brightness characteristics for each shutter speed, according to an exemplary embodiment of the present invention.

Referring to FIG. 7, a dotted line is a graph of brightness characteristics of a speed of the shutter of the image sensing unit 200 and a solid line is a graph of brightness characteristics required for automatic exposure control. The brightness characteristics shown as the solid line is calculated by using the brightness characteristics shown as the dotted line.

Figure 8:
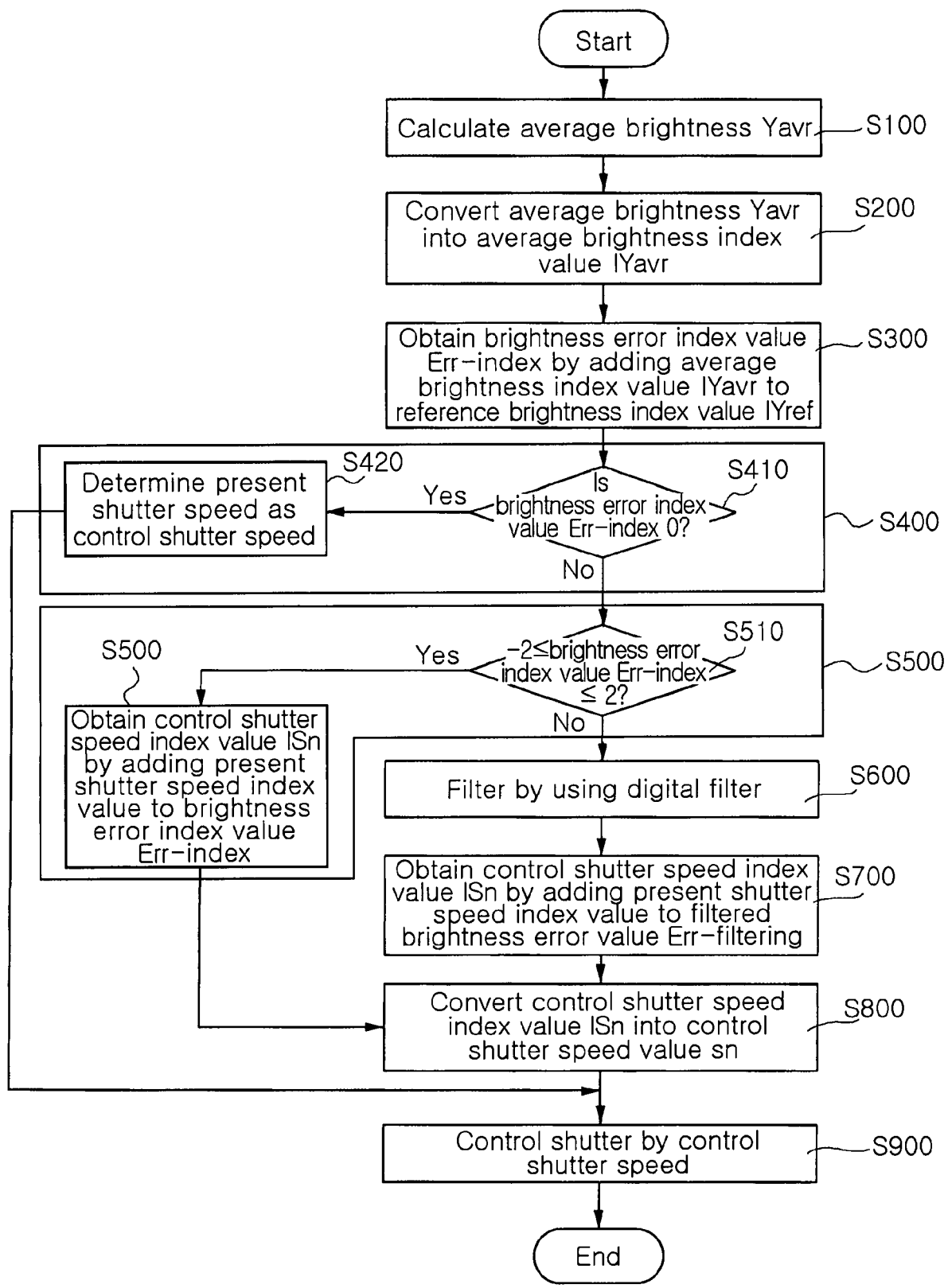
FIG. 8 is a flowchart illustrating an automatic exposure control method of the image sensor, according to an exemplary embodiment of the present invention.

FIG. 8 is a flowchart illustrating an automatic exposure control method in the image sensor module, according to an exemplary embodiment of the present invention.

Referring to FIG. 8, in operation S100, average brightness Yavr of an image at a present shutter speed Sc is calculated for each frame. In operation S200, the average brightness Yavr is converted into an average brightness index value IYavr by referring to a first look-up table in which an index value is previously mapped for each average brightness. In operation S300, a brightness error index value Err-index corresponding to an error between a reference brightness index value IYref assigned to a predetermined reference brightness Yref and the average brightness index value IYavr is obtained. In operation S400, a present shutter speed value Sc is determined as a control shutter speed value Sn when the brightness error index value Err-index is 0. In operation S500, a control shutter speed index value ISsc is determined by adjusting a present shutter speed index value ISc by using the brightness error index value Err-index when the brightness error index value Err-index is not 0 and included within a predetermined minimum error range. In operation S600, a filtered brightness error value Err-filtering is obtained by filtering the brightness error index value Err-index when the brightness error index value Err-index is out of the predetermined minimum error range. In operation S700, the control shutter speed index value ISsc is determined by adjusting the present shutter speed index value ISc by using the filtered brightness error value Err-filtering from the digital filter 440. In operation S800, the control shutter speed index value ISn is converted into the control shutter speed value Sn by referring to a second look-up table in which a shutter speed value Sn is mapped for each the control shutter speed index value ISsc. In operation S900, a speed of the shutter of the image sensing unit 200 by using the control shutter speed value Sn.

Figure 9:
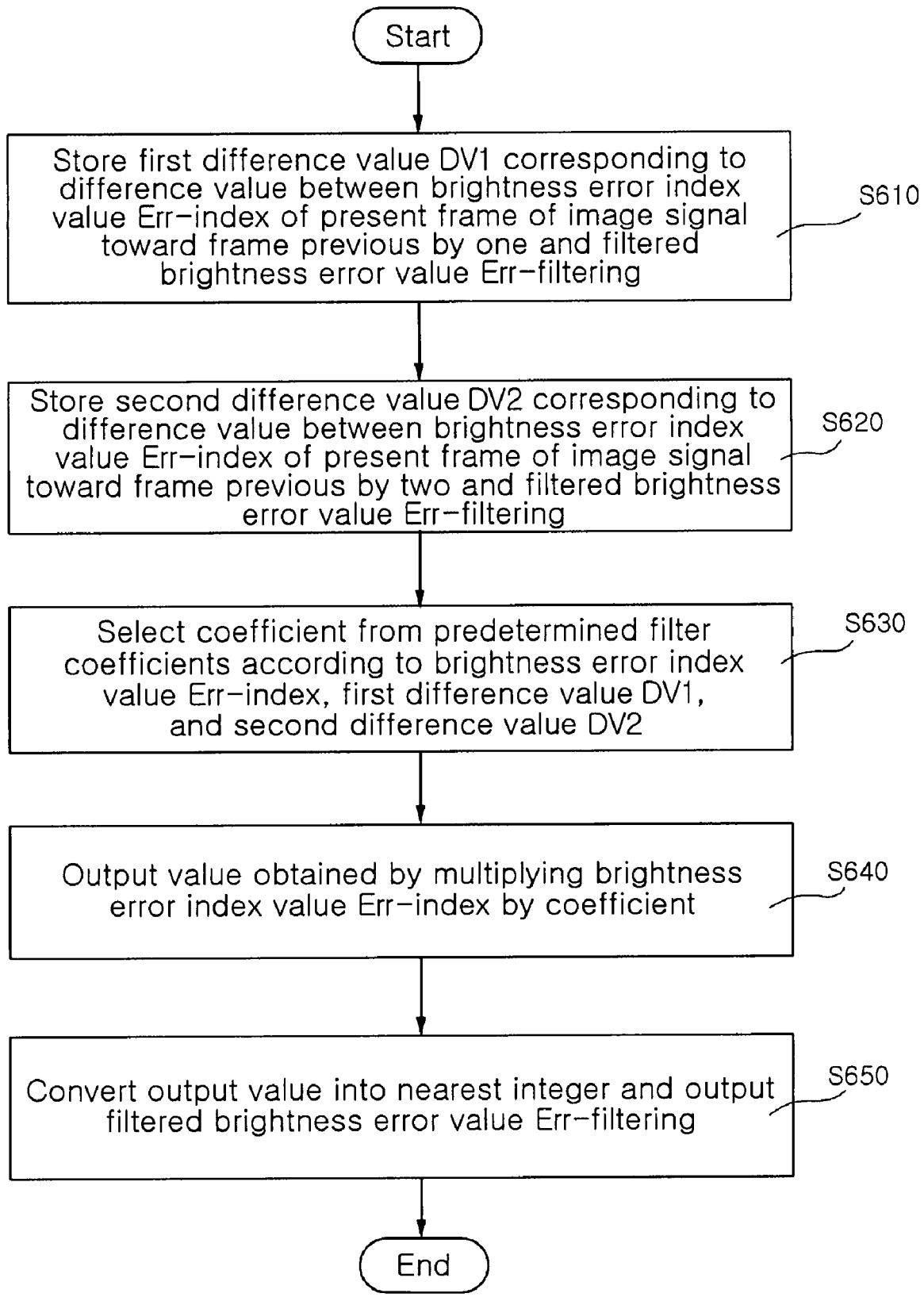
FIG. 9 is a flowchart illustrating a filtering process according to an exemplary embodiment of the present invention.

FIG. 9 is a flowchart illustrating a filtering process according to an exemplary embodiment of the present invention.

Referring to FIG. 9, in operation 610, a first difference value DV1 corresponding to a difference value between the brightness error index value Err-index of a present frame of the image signal toward a frame previous by one and the filtered brightness error value Err-filtering is stored. In operation S620, a second difference value DV2 corresponding to a difference value between the brightness error index value Err-index of the present frame of the image signal toward a frame previous by two and the filtered brightness error value Err-filtering is stored. In operation S630, a coefficient is selected from predetermined filter coefficients according to the brightness error index value Err-index, the first difference value DV1, and the second difference value DV2. In operation S640, the brightness error index value Err-index is multiplied by the coefficient and a value obtained by the multiplying is outputted. In operation S650, the output value is converted into a nearest integer and the filtered brightness error value Err-filtering is outputted.

Hereinafter, the operations and effects of the present invention will be described in detail with reference to the attached drawings.

Referring to FIGS. 2 through 9, the automatic exposure apparatus and method for an image sensor module, according to an exemplary embodiment of the present invention, will be described.

Referring to FIG. 2, the automatic exposure control apparatus according to an exemplary embodiment of the present invention is applied to an image sensor module. An image is incident on the image sensing unit 200 via the lens unit 100 of the image sensor module. In this case, the image sensing unit 200 includes a shutter, photographs the image from the lens unit 100, converts the image into an electric image signal, and outputs the image signal to the image signal processing unit 300. The image signal processing unit 300 restores the image signal from the image sensing unit 200 into an image.

In the described image processing process, brightness of the image is monitored and a speed of the shutter is automatically controlled according to an exemplary embodiment of the present invention.

Referring to FIG. 2, the brightness calculator 410 extracts average brightness from the image signal from the image signal processing unit 300 and outputs the average brightness to the brightness adjustment determiner 420.

For example, the brightness calculator 410 may calculate average brightness Yavr of the image at a present shutter speed Sc for each frame and outputs the average brightness Yavr for each frame to the brightness adjustment determiner 420 (corresponding to S100 of FIG. 8).

The brightness adjustment determiner 420 determines whether to fix or adjust a speed of an exposure control shutter based on a brightness error value corresponding to an error between the average brightness from the brightness calculator 410 and reference brightness, controls the shutter speed controller 460 to fix or adjust the speed of the shutter, and provides the brightness error value to the adjustment path controller 430.

For example, the brightness adjustment determiner 420 converts the average brightness Yavr into an average brightness index value IYavr by referring to a first look-up table in which an index value for each the average brightness is mapped (corresponding to S200 of FIG. 8), obtains a brightness error index value Err-index corresponding to an error between a reference brightness index value IYref assigned to a predetermined reference brightness Yref and the average brightness index value IYavr (corresponding to S300 of FIG. 8), determines whether the brightness error index value Err-index is "0" (corresponding to S410 of FIG. 8), determines a present shutter speed value Sc as a control shutter speed value Sn when the brightness error index value Err-index is "0" (corresponding to S420 of FIG. 8), and controls the present shutter speed value Sc to be adjusted when the brightness error index value Err-index is not "0".

The adjustment path controller 430 controls the shutter speed to be directly adjusted when the brightness error index value is included within a predetermined minimum error range and controls the digital filter 440 to filter the shutter speed when the brightness error value is out of the predetermined minimum error range.

For example, the adjustment path controller 430 controls a present shutter speed index value ISc to be directly adjusted when the brightness error index value Err-index is included in the predetermined minimum error range and controls the present shutter speed index value ISc to be filtered when the brightness error index value Err-index is out of the predetermined minimum error range, according to control of the brightness adjustment determiner 420.

The predetermined minimum error range is a range for determining whether a brightness error is small and may be established differently depending on an application environment of a system to which the image sensor module is applied. For example, the predetermined minimum error range may be established as from −2 to 2 (corresponding to S510 of FIG. 8).

The digital filter 440 filters the brightness error value according to control of the adjustment path controller 430 and outputs a filtered brightness error value to the shutter speed adjustor 450.

For example, the digital filter 440 filters the brightness error index value Err-index according to the control of the adjustment path controller 430 and outputs a filtered brightness error value Err-filtering (corresponding to S600 of FIG. 8).

The shutter speed adjustor 450 adjusts the present shutter speed value by using one of the brightness error value from the adjustment path controller 430 and the filtered brightness error value from the digital filter 440 and provides a control shutter speed value to the shutter speed controller 460.

In detail, the shutter speed adjustor 450 adjusts the present shutter speed index value ISc by using the brightness error index value Err-index from the adjustment path controller 430 when the adjustment path controller 430 directly adjusts (corresponding to S520 of FIG. 8). On the other hand, the shutter speed adjustor 450 adjusts the present shutter speed index value ISc by using the filtered brightness error value Err-filtering from the digital filter 440 when the adjustment path controller 430 controls adjustment by filtering (corresponding to S700 of FIG. 8). Through the described adjustment process, the shutter speed adjustor 450 determines a control shutter speed index value ISn.

For example, the control shutter speed index value ISn may be obtained by adding the brightness error index value Err-index to the present shutter speed index value ISc. Also, the control shutter speed index value ISn may be obtained by adding the filtered brightness error value Err-filtering to the present shutter speed index value ISc.

The shutter speed controller 460 controls the speed of the shutter included in the image sensing unit 200 by using the control shutter speed value.

For example, the shutter speed controller 460 controls the speed of the shutter of the image sensing unit 200 by a previous shutter speed when the brightness adjustment determiner 420 controls the shutter speed to be fixed. On the other hand, when the brightness adjustment determiner 420 controls the shutter speed to be adjusted, the control shutter speed index value ISn is converted into the control shutter speed Sn by referring to a second look-up table in which a control shutter speed value is mapped for each a control shutter speed index value and the speed of the shutter of the image sensing unit 200 by using the control shutter speed value Sn (corresponding to S900 of FIG. 8).

Referring to FIGS. 3 and 9, the operations of the digital filter 440 will be described in detail.

Referring to FIGS. 3 and 9, when a supply voltage is applied, the first register 443 and the second register 444 have an initial value "0". The first register 443 of the digital filter 440 stores a first difference value DV1 corresponding to a difference value between the brightness error index value Err-index of a present frame of the image signal toward a frame previous by one and the filtered brightness error value Err-filtering (corresponding to S610 of FIG. 9). The second register 444 stores a second difference value DV2 corresponding to a difference value between the brightness error index value Err-index of the present frame of the image signal toward a frame previous by two and the filtered brightness error value Err-filtering (corresponding to S620 of FIG. 9).

The coefficient selector 445 of the digital filter 440 selects one of predetermined filter coefficients according to the brightness error index value Err-index, the first difference value DV1, and the second difference value DV2 (corresponding to S630 of FIG. 9).

The multiplier 441 of the digital filter 440 multiplies the predetermined coefficient by the brightness error index value Err-index and outputs an output value obtained by the multiplying to the integer converter 442 (corresponding to S640 of FIG. 9). The integer converter 442 converts the output value from the multiplier 441 into a closest integer and outputs the filtered brightness error value Err-filtering (corresponding to S650 of FIG. 9).

Hereinafter, the coefficient selector 445 will be described in detail.

The brightness error index value Err-index is defined as a value obtained by subtracting the reference brightness index value IYref from the average brightness index value IYavr. The first difference value DV1 is defined as a value obtained by subtracting the filtered brightness error value Err-filtering corresponding to an output of the digital filter 440 from the brightness error index value Err-index corresponding to an input of the digital filter 440, with respect to the frame previous to the present frame by one. The second difference value DV2 is defined as a value obtained by subtracting the filtered brightness error value Err-filtering corresponding to the output of the digital filter 440 from the brightness error index value Err-index corresponding to the input of the digital filter 440, with respect to the frame previous to the present frame by two.

When signs of the brightness error index value Err-index, the first difference value DV1, and the second difference value DV2 are identical with others, the largest one may be selected from the predetermined coefficients. When only the signs of the brightness error index value Err-index and the first difference value DV1 are identical with each other, a middle one may be selected from the predetermined coefficients. When the sign of the brightness error index value Err-index is different from the sign of the first difference value DV1, the smallest one may be selected from the predetermined coefficients.

Via the described process, the input of the digital filter 440 is outputted after being multiplied by the selected coefficient and converted into an integer. As soon as one image frame is finished, the difference value between the input and the output of the digital filter 440 is stored in the first register 443. At the same time, a value of the first register 443 is stored in the second register 444. The digital filter 440 continues the described operations over again.

Also, there may be several coefficients of the digital filter 440, varying with characteristics of an image sensor module to which the present invention will be applied.

Referring to FIG. 4, response curves shown in FIG. 4 have a different time constant that the digital filter reaches a stable state, from others. Referring to FIG. 4, the time constant becomes large when using a coefficient of a curve showing a gradually rising response. That is, a large amount of time is required to detect a suitable exposure. Also, when using a coefficient of a curve showing a rapidly rising response, the time constant becomes small. Accordingly, the suitable exposure is detected in a short time.

For example, when brightness is rapidly changed as the case of turning up a light in a dark room, the shutter speed may be actively changed using the digital filter 440 having the coefficient showing rapidly rising response. Also, the coefficients used by the digital filter 440 is not fixed value and may be adjusted according to characteristics of an image sensor module to which the present invention is applied, thereby providing high flexibility.

On the other hand, as described above, the automatic exposure control apparatus according to an exemplary embodiment of the present invention may actively process a shutter speed by using a digital filter having response curves of different time constants as shown in FIG. 4 when largely adjusting the shutter speed to obtain a suitable exposure.

Referring to FIG. 5, an output waveform of the digital filter when a staircase waveform transiting from "0" to "1" is inputted to the digital filter 440 is shown. In this case, in FIG. 5, a state after a point in time when the digital filter 440 outputs "1" is designated as the stable state and a time for outputting from "0" to "1" is designated as the time constant.

As described above, the operations of the automatic exposure apparatus according to an exemplary embodiment of the present invention will be described by referring to FIG. 6.

Referring to FIG. 6, the lower a shutter speed S, the higher an average brightness Yavr. The higher the shutter speed S, the lower the average brightness Yavr. In this case, reference brightness Yref has a middle value of assigned brightness values.

On the other hand, in Table 1, a sequential value is assigned to a shutter speed and an average brightness according to the characteristics of the image sensor module to which the automatic exposure control apparatus according to an exemplary embodiment of the present invention is applied. In Table 1, a value assigned to the reference brightness index value IYref becomes "5" that is the middle value.

TABLE 1

| Shutter Speed Sc (sec) | Shutter Speed Index Value ISc | Average Brightness Yavr | Average Brightness Index Value IYavr |
|---|---|---|---|
| 1 | 0 | 228 | 10 |
| 1/2 | 1 | 222 | 9 |
| 1/4 | 2 | 210 | 8 |
| 1/8 | 3 | 191 | 7 |
| 1/15 | 4 | 162 | 6 |
| 1/30 | 5 | 126 | 5 |
| 1/60 | 6 | 89 | 4 |
| 1/125 | 7 | 60 | 3 |
| 1/250 | 8 | 40 | 2 |
| 1/500 | 9 | 29 | 1 |
| 1/1000 | 10 | 23 | 0 |

Referring to Table 1, for example, when the average brightness Yavr is "191", the average brightness index value is "7". In this case, since the value assigned to the reference brightness index value IYref is "5" that is the middle value, the brightness error index value Err-index is "2(7−5)", the control shutter speed index value ISn becomes "5" by adding "2" that is the brightness error index value Err-index to "3" that is a present shutter speed index value, and the shutter speed corresponds to "1/30"

This is, a shutter speed is adjusted from "1/8" corresponding to "3" that is the present shutter speed index value ISc to "1/30", thereby controlling the shutter speed to be quicker because a previous brightness is too high.

As described above, according to an exemplary embodiment of the present invention, an exposure of an image incident on the image sensor module is determined according to a shutter speed. Since an average brightness of the inputted image becomes lowered when the shutter speed becomes higher and the average brightness of the inputted image becomes higher when the shutter speed becomes the higher, there is a certain form when showing this in a graph.

Accordingly, an average brightness at a present shutter speed is obtained, a new shutter speed is obtained by comparing the present shutter speed with a shutter speed at reference brightness, the new shutter speed is inputted to the digital filter 440, and an output value is gradually changed to the new shutter speed, thereby obtaining a natural output image.

Therefore, the control as described above is performed based on a brightness error between an average brightness index value indicating a brightness of a present image and a reference brightness index value. As a result of the control, a present average brightness follows the reference brightness.

Referring to FIG. 7, a dotted line is a graph of brightness characteristics of a shutter speed of an image sensor module and a solid line is a graph of brightness characteristics required for automatic exposure control. The brightness characteristics shown as the solid line is calculated by using the brightness characteristics shown as the dotted line. A gradient of a straight line corresponding to a section showing linear characteristics is obtained based on a reference brightness value Yref, and a gradient of a straight line corresponding to a section saturated with a maximum brightness value Ymax and a minimum brightness value Ymin is obtained. In this case, the graph of brightness characteristics with respect to a shutter speed applied to the automatic exposure control is calculated, the graph shown in the solid line in FIG. 7.

As described above, according to an exemplary embodiment of the present invention, an automatic exposure control apparatus for an image sensor applied to a camera module controls an exposure to be suitable by using average brightness without a micro controller and changes a shutter speed by using a digital filter, thereby actively adapting to rapid and frequent brightness variances of images and operating at high speed.

Also, high-speed calculation is performed by converting an average brightness value an index value, thereby processing a signal in real-time to actively adapt to brightness variances of images.

In addition, a suitable exposure is detected in a short time, rapidly and frequently changed brightness is actively processed, and the micro controller is not used, thereby notably reducing a size of an image sensor module manufactured as an application specific integrated circuit.

While the present invention has been shown and described in connection with the exemplary embodiments, it will be apparent to those skilled in the art that modifications and variations can be made without departing from the spirit and scope of the invention as defined by the appended claims.

What is claimed is:

1. An automatic exposure control apparatus employed by an image sensor module comprising a lens unit receiving an incident image, an image sensing unit having a shutter, photographing the image from lens unit via the shutter, and converting the image into an electrical image signal, and an image signal processing unit restoring the image signal from the image sensing unit to an image, the apparatus comprising:
a brightness calculator extracting average brightness from the image signal of the image signal processing unit;
a brightness adjustment determiner determining whether to fix or adjust a speed of the shutter based on a brightness error value corresponding to an error between the average brightness from the brightness calculator and reference brightness;
an adjustment path controller directly controlling the speed of the shutter to be adjusted when the brightness error value is included within a predetermined minimum error range and controlling the speed of the shutter to be filtered when the brightness error value is out of the predetermined minimum error range;
a digital filter filtering the brightness error value according to control of the adjustment path controller and outputting a filtered brightness error value;
a shutter speed adjuster adjusting a present shutter speed value by using one of the brightness error value from the adjustment path controller and the filtered brightness error value from the digital filter and providing a control shutter speed value; and
a shutter speed controller controlling a speed of the shutter of the image sensing unit by using the control shutter speed value.

2. The apparatus of claim 1, wherein the brightness calculator calculates the average brightness of the image at a present shutter speed for each frame.

3. The apparatus of claim 2, wherein the brightness adjustment determiner converts the average brightness into an average brightness index value by referring to a first look-up table in which an index value for each average brightness is previously mapped, obtains a brightness error index value corresponding to an error between a reference brightness index value and the average brightness index value, determines the present shutter speed value as the control shutter speed value when the brightness error index value is 0, and determines controls the present shutter speed value to be adjusted when the brightness error index value is not 0.

4. The apparatus of claim 3, wherein the adjustment path controller controls a present shutter speed index value to be adjusted when the brightness error index value is included within a predetermined minimum error range and controls the present shutter speed index value to be filtered when the brightness error index value is out of the predetermined minimum error range, according to control of the brightness adjustment determiner.

5. The apparatus of claim 4, wherein the digital filter filters the brightness error index value and outputs a filtered brightness error value according to control of the adjustment path controller.

6. The apparatus of claim 5, wherein the shutter speed adjuster adjusts the shutter speed index value by using one of the brightness error index value from the adjustment path controller and the filtered brightness error value from the digital filter and determines a control shutter speed index value.

7. The apparatus of claim 6, wherein the shutter speed controller converts the control shutter speed index value into the control shutter speed value by referring to a second look-up table in which the control shutter speed value is previously mapped for each the control shutter speed index value and controls the speed of the shutter of the image sensing unit by using the control shutter speed value.

8. The apparatus of claim 4, wherein the predetermined minimum error range is determined as from −2 to 2.

9. The apparatus of claim 5, wherein the digital filter comprises:
 a multiplier multiplying the brightness error index value by a predetermined coefficient;
 an integer converter converting an output value from the multiplier into a closest integer and outputting a filtered brightness error value;
 a first register storing a first difference value corresponding to a difference value between the brightness error index value of a present frame of the image signal toward a frame previous by one and the filtered brightness error value;
 a second register storing a second difference value corresponding to a difference value between the brightness error index value of the present frame of the image signal toward a frame previous by two and the filtered brightness error value; and
 a coefficient selector selecting one of predetermined filter coefficients according to the brightness error index value, the first difference value, and the second difference value.

10. An automatic exposure control method of an image sensor module comprising a lens unit receiving an incident image, an image sensing unit having a shutter, photographing the image from lens unit and converting the image into an electrical image signal, and an image signal processing unit restoring the image signal from the image sensing unit to an image, the method comprising:
 calculating average brightness of an image at a present shutter speed, for each frame;
 converting the average brightness into an average brightness index value by referring to a first look-up table in which an index value is previously mapped for each average brightness;
 obtaining a brightness error index value corresponding to an error between a reference brightness index value assigned to a predetermined reference brightness and the average brightness index value;
 determining a present shutter speed value as a control shutter speed value when the brightness error index value is 0;
 determining a control shutter speed index value by adjusting a present shutter speed index value by using the brightness error index value when the brightness error index value is not 0 and included within a predetermined minimum error range;
 obtaining a filtered brightness error value by filtering the brightness error index value when the brightness error index value is out of the predetermined minimum error range;
 determining the control shutter speed index value by adjusting the present shutter speed index value by using the filtered brightness error value from a digital filter;
 converting the control shutter speed index value into the control shutter speed value by referring to a second look-up table in which the shutter speed value is mapped for each the control shutter speed index value; and
 controlling a speed of the shutter of the image sensing unit by using the control shutter speed value.

11. The method of claim 10, wherein the predetermined minimum error range is determined as from −2 to 2.

12. The method of claim 11, wherein the obtaining a filtered brightness error value comprises:
 storing a first difference value corresponding to a difference value between the brightness error index value of a present frame of the image signal toward a frame previous by one and the filtered brightness error value;
 storing a second difference value corresponding to a difference value between the brightness error index value of the present frame of the image signal toward a frame previous by two and the filtered brightness error value;
 selecting a coefficient from predetermined filter coefficients according to the brightness error index value, the first difference value, and the second difference value;
 multiplying the brightness error index value by the coefficient and outputting a value obtained by the multiplying; and
 converting the output value into a nearest integer and outputting the filtered brightness error value.

* * * * *